United States Patent
Muranaka et al.

(10) Patent No.: US 7,653,121 B2
(45) Date of Patent: Jan. 26, 2010

(54) POWER LEVEL MEASURING DEVICE AND A MOBILE STATION

(75) Inventors: Masayuki Muranaka, Kawasaki (JP);
Tadamitsu Hirai, Kawasaki (JP);
Takashi Sasaki, Kawasaki (JP);
Masashi Kitada, Kawasaki (JP);
Hideyuki Araki, Kawasaki (JP);
Daisaku Yamane, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 569 days.

(21) Appl. No.: 11/024,368

(22) Filed: Dec. 28, 2004

(65) Prior Publication Data

US 2006/0034349 A1 Feb. 16, 2006

(30) Foreign Application Priority Data

Aug. 16, 2004 (JP) .............................. 2004-236713

(51) Int. Cl.
*H04B 1/69* (2006.01)
(52) U.S. Cl. ........................................ 375/142; 375/343
(58) Field of Classification Search ................. 375/142, 375/148, 343, 329; 455/234.1
See application file for complete search history.

(56) References Cited

U.S. PATENT DOCUMENTS

| | | | | | |
|---|---|---|---|---|---|
| 5,621,723 | A | * | 4/1997 | Walton et al. ................ | 370/335 |
| 5,697,053 | A | * | 12/1997 | Hanly .......................... | 375/130 |
| 5,982,763 | A | * | 11/1999 | Sato ............................ | 370/342 |
| 6,055,281 | A | * | 4/2000 | Hendrickson et al. ....... | 375/329 |
| 6,085,107 | A | * | 7/2000 | Persson et al. .............. | 455/522 |
| 6,119,004 | A | | 9/2000 | Yamada et al. | |
| 6,151,502 | A | * | 11/2000 | Padovani et al. ............ | 455/442 |
| 6,178,194 | B1 | * | 1/2001 | Vasic ........................... | 375/136 |
| 6,301,289 | B1 | * | 10/2001 | Bejjani et al. ............... | 375/144 |
| 6,421,370 | B1 | * | 7/2002 | Yasaki ......................... | 375/141 |
| 6,487,420 | B1 | * | 11/2002 | Jonsson ....................... | 455/522 |
| 6,549,772 | B1 | * | 4/2003 | Chavez et al. ............. | 455/422.1 |
| 6,763,056 | B1 | * | 7/2004 | Ohsuge ...................... | 375/140 |
| 6,873,845 | B2 | * | 3/2005 | Hanly ......................... | 455/436 |
| 7,035,676 | B2 | * | 4/2006 | Ranta ......................... | 455/574 |
| RE39,177 | E | * | 7/2006 | Padovani et al. ............ | 455/442 |

(Continued)

FOREIGN PATENT DOCUMENTS

EP 1 067 700 * 1/2001

(Continued)

OTHER PUBLICATIONS

European Search Report dated Dec. 5, 2005.

(Continued)

*Primary Examiner*—Temesghen Ghebretinsae
(74) *Attorney, Agent, or Firm*—Katten Muchin Rosenman LLP

(57) ABSTRACT

A disclosed power level measuring device includes a power calculator for calculating power values based on correlation values between a received signal and known signals, for each of sampling times within a predetermined period; a time divider for switching connection of input signals, responding to time slots allocated to each of plural cells; an accumulator connected to the time divider, for accumulating the power values; a detector for detecting at least one sampling time whose accumulated value is greater than a threshold; a memory connected to the time divider, for storing the power values; and an outputting unit for outputting a measured power level, based on the stored power value corresponding to the detected sampling time.

10 Claims, 5 Drawing Sheets

U.S. PATENT DOCUMENTS

| | | | |
|---|---|---|---|
| 7,113,758 B2 * | 9/2006 | Kishi | 455/234.1 |
| 7,142,586 B2 * | 11/2006 | Reial | 375/148 |
| 7,421,010 B2 * | 9/2008 | Kikuchi | 375/147 |
| 2004/0052304 A1 | 3/2004 | Reial | |
| 2004/0105418 A1 * | 6/2004 | Hirade | 370/342 |
| 2005/0058103 A1 * | 3/2005 | Jeong et al. | 370/335 |
| 2005/0078639 A1 * | 4/2005 | Oura | 370/335 |
| 2005/0254563 A1 * | 11/2005 | Arima | 375/227 |
| 2006/0034349 A1 * | 2/2006 | Muranaka et al. | 375/142 |
| 2006/0251024 A1 * | 11/2006 | Wang | 370/333 |
| 2008/0130718 A1 * | 6/2008 | Catreux-Erceg et al. | 375/148 |
| 2009/0041163 A1 * | 2/2009 | Jonsson et al. | 375/340 |

FOREIGN PATENT DOCUMENTS

| | | | |
|---|---|---|---|
| EP | 1 337 048 | | 8/2003 |
| EP | 1 487 127 | | 12/2004 |
| JP | 08-237172 | * | 9/1996 |
| JP | 10-190522 | | 7/1998 |
| JP | 10-190522 | * | 7/1999 |
| JP | 11-317694 | * | 11/1999 |
| JP | 2001246239 | | 12/2001 |
| JP | 2003-46412 | | 2/2003 |
| WO | 9813956 | | 4/1998 |
| WO | WO 99/63677 | | 12/1999 |
| WO | WO 9963677 | * | 12/1999 |

OTHER PUBLICATIONS

Office Action dated Oct. 20, 2009, from the corresponding Japanese Application No. JP 2004-236713.

Physical layer measurement in UTRA TDD mode, TSG-RAN WG1 meeting # 8 TSGRI # 6, Sep. 1999, pp. 2-8, Siemens.

* cited by examiner

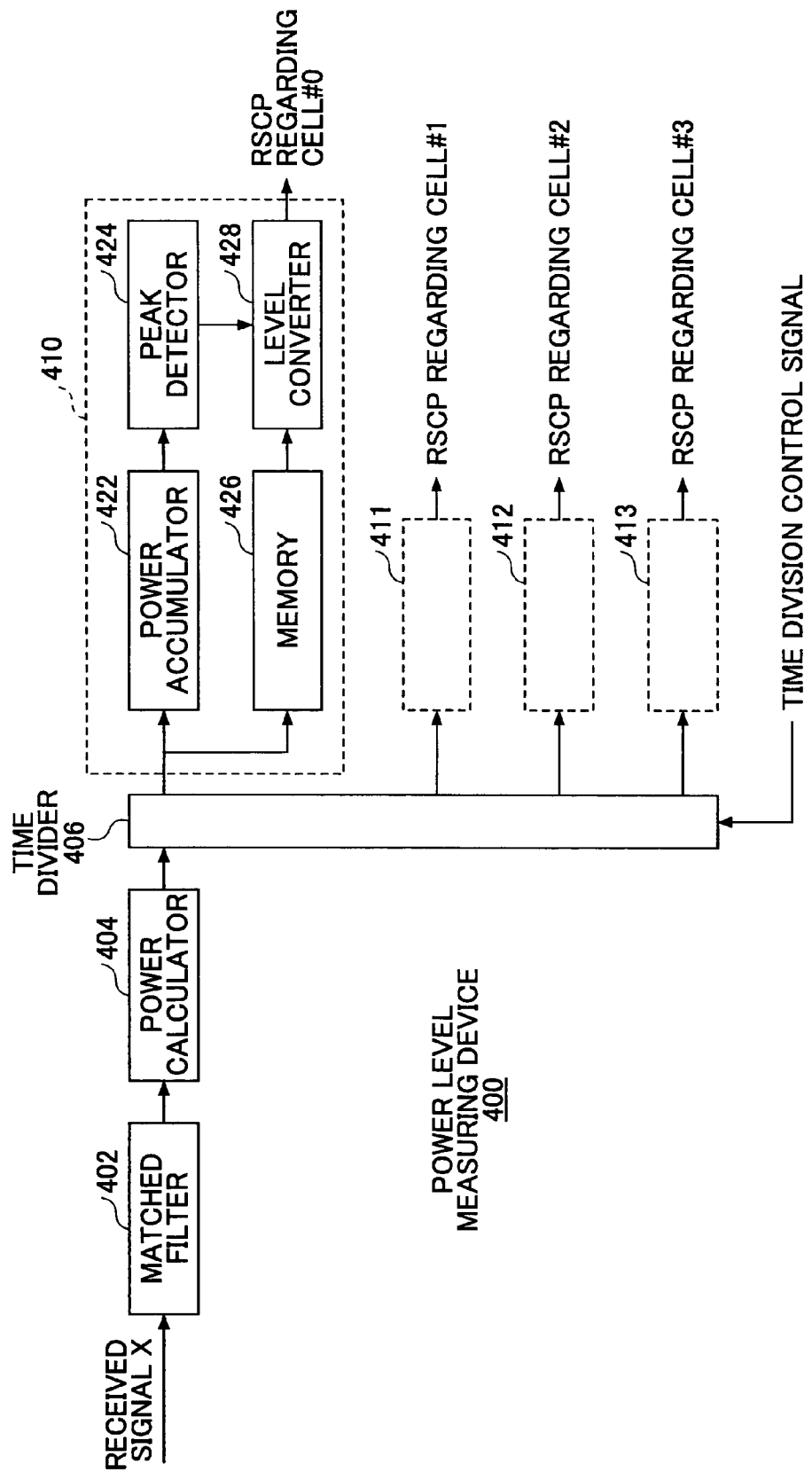

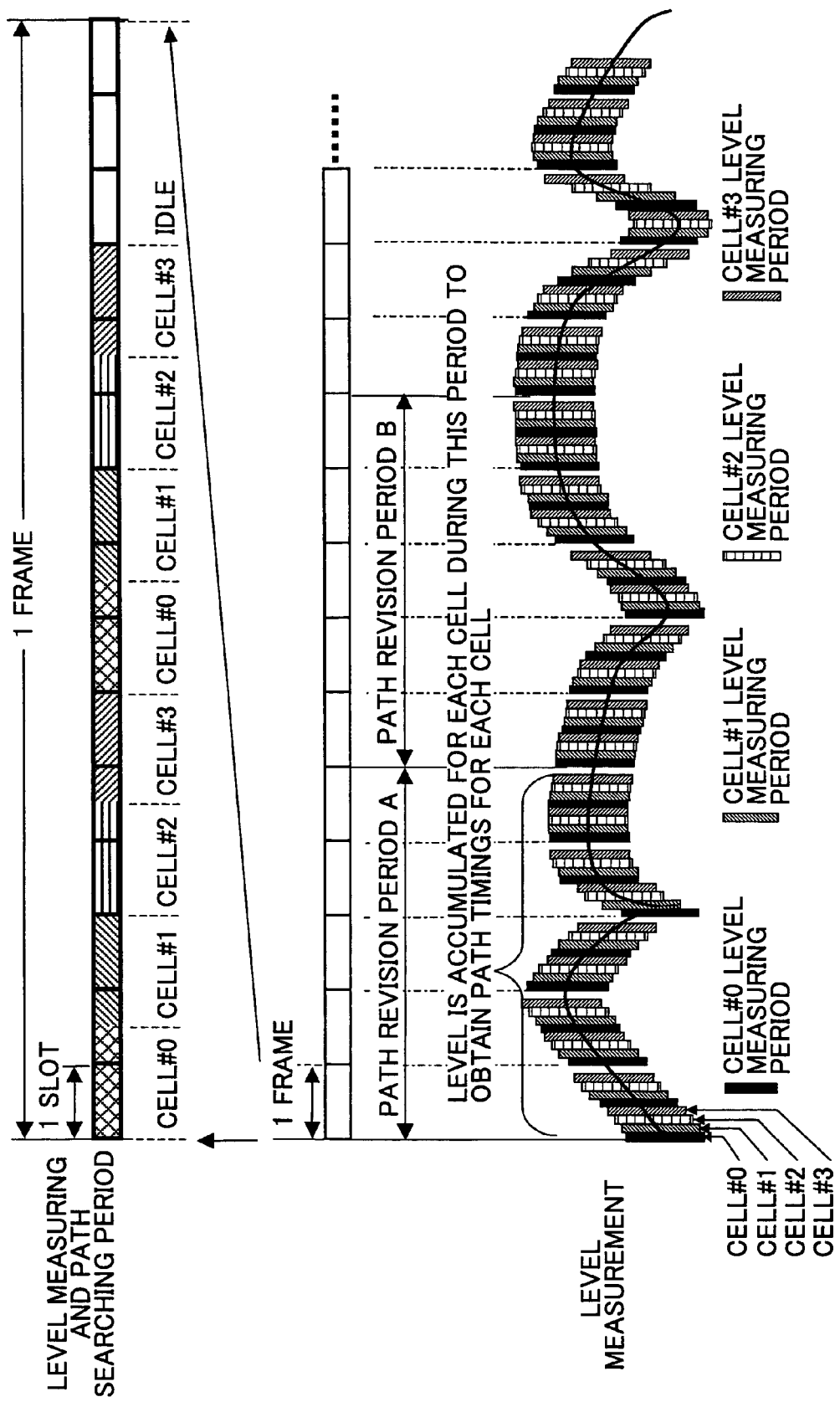

POWER LEVEL MEASURING DEVICE AND A MOBILE STATION

BACKGROUND OF THE INVENTION

1. Field of the Invention

The present invention generally relates to a power level measuring device and a mobile station in a mobile communications system having a plurality of cells.

2. Description of the Related Art

In a mobile communications system including a plurality of cells, a mobile station generally detects the cell transmitting the pilot channel having the largest reception power, when initializing or during an intermittent receiving situation. When performing soft handover, such a mobile station detects the cell transmitting the pilot channel having the second largest reception power.

In a W-CDMA communications system, three stage cell searches are performed, using frame timing, scrambling code groups detected by P-SCH, S-SCH, and scrambling code utilized for spreading CPICH (Common Pilot Channel).

The mobile station performs the cell search, and specifies scrambling codes and despreading timings.

The cell search is required for carrying out RAKE synthesis of signals received via multipath. For each path, CPICH is used to specify despreading timings (path timings).

The path timings are likely to move forward and backward depending on the communications environment. Therefore, the path search should be performed regularly even after path timing detection.

Based on the path timings obtained through path searching, the mobile station reports power levels from ambient cells to the network when required.

FIG. 1 is a functional block diagram of a prior art power level measuring device that can be mounted on a communication apparatus such as a mobile station of a mobile communications system.

The power level measuring device comprises a path searching unit 110 and a demodulation unit 130. The path searching unit 110 comprises a matched filter 112, a power calculator 114, a power accumulator 116, a peak detector 118, and is also called a "searcher".

The path searching unit 110 has a cell searching function (three stage cell searching function) mentioned above. Path searching is explained below.

The demodulating unit 130 comprises a sliding correlator 132, a power calculator/synchronous detector 134, a RAKE synthesizer 135 and a level converter 136. Plural sliding correlators 132 performing despreading are provided, and they are used in despreading received signals with respect to each multipath or each channel.

Timing at which each sliding correlator 132 despreads is in accordance with path timing reported by the path searching unit 110.

Path searching and level measuring processes performed in the path searching unit 110 are explained below.

The matched filter 112 calculates correlation values cpich_symbol [m][i] between a received signal "x" and known codes "c" for each sampling time within a predetermined range by the following Equation 1.

$$\text{cpich\_symbol}[m][i] = \sum_{k=1}^{nscode} x[t + (m-320) + (i \times 1024) + 4 \times k] \times \text{code}[k] \quad \text{Equation 1}$$

wherein "m" is a parameter defining a sampling time, and m=0, 1, . . . , 638, 639. The symbol "i" is a parameter defining a data symbol number, and i=0, 1, 2, . . . . Summation is done in the range of k=1, 2, . . . , nscode. The nscode is the number of chips included in one symbol of a CPICH signal, for example 256 chips. The symbol "t" means a path timing, which is determined by path searching. Within ±320 samples from this path timing being center, 640 correlation values as a total are calculated per one symbol. In this prior art example, one chip is represented by four samples (four times over sampling). The relationship between "t" and "m" is illustrated in FIG. 2A. Code[k] means a spreading code, and may be represented by a product of a channelization code CC[k] and a scrambling code SC[k].

The power calculator 114 calculates a sum of squares of in-phase and quadrature coefficients of the correlation values to obtain a power value (the received signal x is modulated with a quadrature modulation method). Such a power value is calculated for each of the 640 correlation values obtained per symbol.

The power accumulator 116 accumulates the power values obtained over 640 samples, at each sampling time. Accordingly there appear plural paths near to path timing "t".

The peak detector 118 selects four path timings $t_0$, $t_1$, $t_2$ and $t_3$ corresponding to the four largest paths near to "t", based on the accumulation results in the power accumulator 116 (cf. FIG. 2(B)). Using each of the path timings, the heading frame of the following received signal is maintained properly for each multipath, and power measuring is performed in the demodulation unit 130.

The sliding correlator 132 uses the four path timings $t_0$, $t_1$, $t_2$ and $t_3$ reported by the peak detector 118, and calculates a correlation value cpich_symbol [n][i] between the following received signal and known signals by the Equation 2.

$$\text{cpich\_symbol}[n][i] = \sum_{k=1}^{nscode} x[t_n + (i \times 1024) + 4 \times k] \times \text{code}[k] \quad \text{Equation 2}$$

wherein "n" is a parameter defining four path timings, n=0, 1, 2, 3. Other symbols are the same as the above. In this manner, four correlations that are despread received signals are output for each symbol.

The power calculator/synchronous detector 134 averages the despread signals and outputs the averaged signals to the RAKE synthesizer 135. The power calculator/synchronous detector 134 can perform power calculation when measuring power level, and can perform synchronous detection when demodulating data. When demodulating data, data after RAKE synthesizing are output to a demodulating part (not shown), not to the level converter 136.

When a base station is under a transmission diversity condition, averaging is performed after pilot-canceling a received signal from one antenna, and RAKE synthesis is performed similarly.

The RAKE synthesizer 135 performs RAKE synthesis on each path (four paths), and outputs RAKE synthesized signals to the level converter 136.

The level converter 136, based on the RAKE synthesized signals, calculates a signal-to-noise power ratio $E_c/No$ per chip. By multiplying this value with received signal strength RSSI, adequately converted power level RSCP is calculated.

The received signal strength can be determined by a radio unit (not shown) provided before the power measuring unit, based on a control signal of an automatic gain controller.

Thus calculated level measured value is transmitted to a network controlling device (RNC) via a radio base station, and utilized for handover control or other processing.

FIG. 3 is a timing chart with respect to level measuring and path searching.

As shown in the upper portion of FIG. 3, a radio signal received at a mobile station comprises a frame (10 ms) including a plurality (15) of time slots.

The level measuring is performed for plural cells (#0-#3) during one frame, and cells to be level-measured are switched at every 1.5 slots in the shown example.

As shown in the upper portion of FIG. 3, cell #0 is level-measured at the head of one frame. Next, cell #1, then cell #2, cell #3, and again cell #0. In this manner, despreading codes set in the sliding correlator 132 are switched so that each cell is level-measured twice during one frame.

The reason why 1.5 slots are allocated to the level-measuring time for each cell is to consider switching time for despreading codes. One slot is consumed for measuring power and switching despreading codes is done during 0.5 slots as overhead.

The middle portion of FIG. 3 shows path searching periods.

As shown in FIG. 3, a path search for one cell is performed during one frame, and cells to be path-searched are switched at every frame.

That is, despreading codes given to the matched filter 112 are switched at every frame.

In this example, the path search results for each cell are reflected (revised) immediately after measurement.

That is, as for cell #0, the path search results obtained during the first frame are applied to the second frame-the sixth frame. The level measurement during the period is carried out so that the sliding correlator 132 performs despreading according to the path timing detected in the first frame.

Next cell search for cell #0 is performed in the sixth frame. The level measurement on and after the seventh frame is performed based on path timings detected during the sixth frame.

The detected path timings can be given to a despreading processing unit for demodulating data.

The lower portion of FIG. 3 shows level measuring time by width of bars. Only Cell #0 is shown, but level measurement is also done for cell #1, cell #2 and cell #3, of course.

Correlation shown by a solid line typically represents that the reception level varies due to fading. It can be seen that the level measuring period is dispersed and therefore the influence of fading is well suppressed by averaging by power calculator/synchronous detector 134.

Another prior art communications system is described, for example, in Japanese Laid-Open Publication No. 11-317694.

The mobile station uses both the correlator in the path searching unit and the correlator in the demodulation unit, and therefore consumption of power in the correlators becomes twice as much.

It is one object of the present invention to reduce power consumption required for power level measuring.

Especially when a sliding correlator is used for correlation detecting, a plurality of multiplying circuits are provided for correlation calculation resulting in large circuit size. In this case, it is highly desirable to reduce power consumption.

A mobile station goes into a waiting mode in order to reduce power consumption, except while it is used for talking. A network may give an instruction to a mobile station anytime and the mobile station has to measure power level even while it is in the waiting mode. Then the mobile station starts the demodulation unit 130 and consumes power for purposes other than talking. This is disadvantageous especially for small mobile phones having limited battery capacity.

The received signal used by the peak detector 118 for determining path timings $t_0$, $t_1$, $t_2$ and $t_3$ is different from the received signal used by the sliding correlator 132 for despreading for level measurement.

That is, in FIG. 3, the path detected by path searching for cell #0 during the first frame is applied to the following second and sixth slots. The received signal used for path searching and the received signal used for level measuring do not have the same position.

Since the path search is done within any one frame in the path revision period, it is difficult to deal with environmental variation in the path revision period.

SUMMARY OF THE INVENTION

It is a general object of the present invention to provide a power level measuring device and a mobile station to solve at lease one problem mentioned above.

Features and advantages of the present invention are set forth in the description that follows, and in part will become apparent from the description and the accompanying drawings, or may be learned by practice of the invention according to the teachings provided in the description. Objects as well as other features and advantages of the present invention will be realized and attained by a power level measuring device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides as follows.

According to an aspect of the present invention, a power level measuring device is disclosed, which comprises: a power calculator (404) for calculating power values based on correlation values between a received signal and known signals, for each of sampling times within a predetermined period; a time divider for switching connection of input signals, responding to time slots allocated to each of plural cells; an accumulator connected to the time divider, for accumulating the power values respectively; a detector for detecting at least one sampling time whose accumulated value is larger than a threshold; a memory connected to the time divider, for storing the power values; and an outputting unit for outputting a measured power level, based on the stored power value corresponding to the detected sampling time.

According to another aspect of the present invention, a mobile station is disclosed, which comprises: a correlation calculator for calculating correlations between a received signal and predetermined despreading codes; a searching unit for outputting path timings based on the calculated correlations; and a power level measuring unit for calculating a received power level based on the correlations corresponding to the path timings.

According to an embodiment of the present invention, a mobile station can measure power levels of signals from its own cell and other cells with reduced power consumption, and the accuracy of power measurement is improved.

Since power level is measured based on power values stored in a memory, it is not necessary to start a demodulation unit for power measuring. Therefore, power consumption is reduced.

According to other features of the present invention, the predetermined period may include a path timing determined by cell searching. The measured power level may be proportional to a received-signal-strength and to a signal-to-noise power ratio per chip. The received-signal-strength may be determined by a control signal from an automatic gain controller. The power level measuring device may further comprise a converter for converting the power value to a signal-to-noise power ratio per chip. The power level measuring device may further comprise an averaging unit for averaging the signal-to-noise power ratio per chip. The measured power levels with respect to plural cells may be output during one frame including a plurality of time slots. The measured power levels with respect to one cell may be output at a constant timing during plural frames. The power level measuring device may further comprise an averaging unit for averaging the correlation values.

BRIEF DESCRIPTION OF THE DRAWINGS

FIG. 4 is a functional block diagram of a power level measuring device according to one embodiment of the present invention;
and
FIG. 5 is a timing chart with respect to the power level measurement and path search.

DESCRIPTION OF THE PREFERRED EMBODIMENTS

Figure 1:
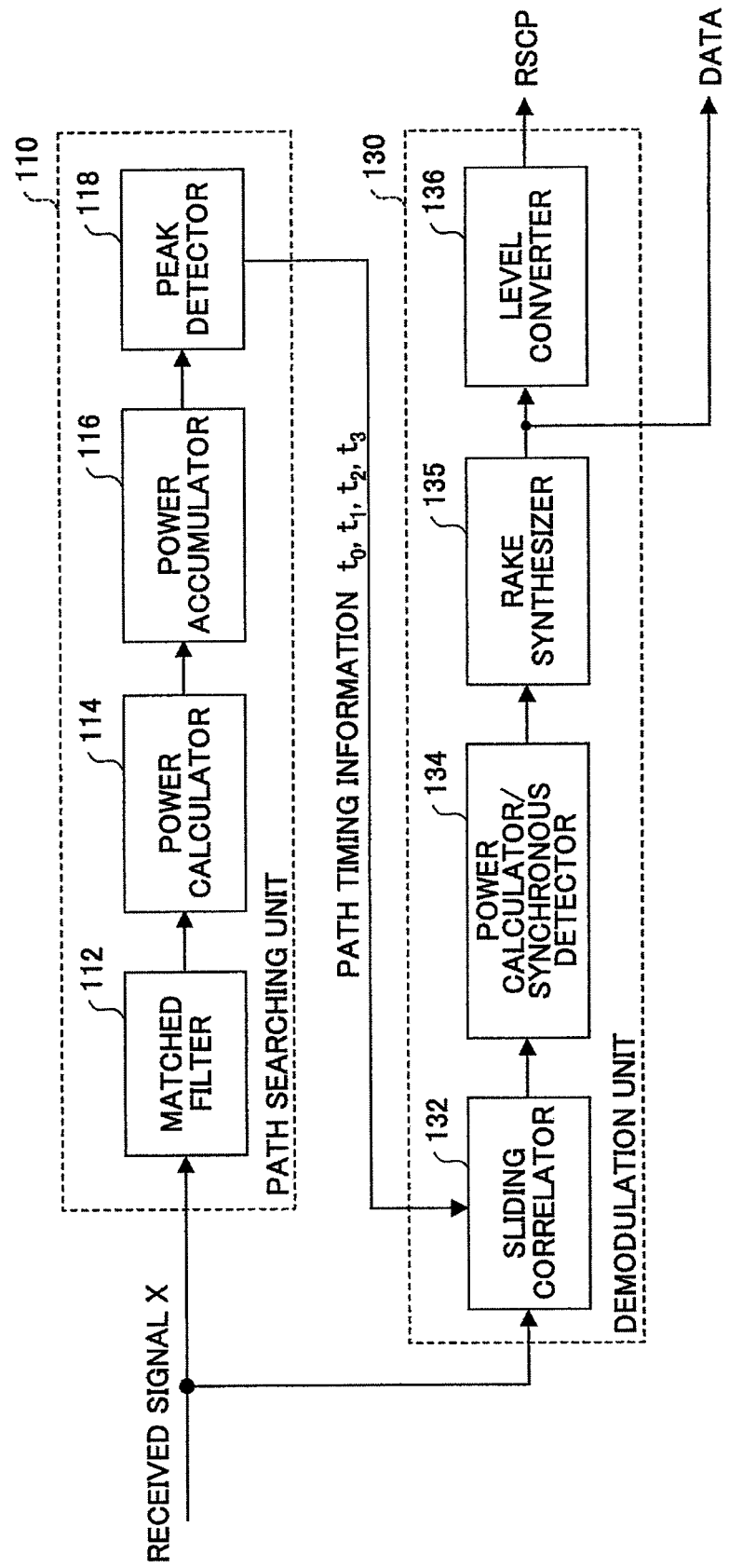
FIG. 1 is a functional block diagram of a prior art power level measuring device.

In the following, an embodiment of the present invention is described with reference to the accompanying drawings.

FIG. 4 is a functional block diagram of a power level measuring device 400 according to one embodiment of the present invention. This power level measuring device 400 can be mounted on a communication apparatus such as a mobile station of mobile communications system. The power level measuring device 400 comprises a matched filter 402 functioning as a correlation detector, a power calculator 404, a time divider 406, measuring units 410, 411, 412 and 413 corresponding to cells #0, #1, #2 and #3, respectively. The measuring units 410-413 have the same structure and function, and therefore only one measuring unit 410 is explained, representing other units.

The measuring unit 410 comprises a power accumulator 422, a peak detector 424, a memory 426 and a level converter 428.

The power level measuring device 400 corresponds to the path searching unit 110 shown in FIG. 1. The prior art example shown in FIG. 1 has two correlators, the matched filter 112 and the sliding correlator 132, but the embodiment shown in FIG. 4 has only one matched filter 402 as a correlator.

The power level measuring device 400 has a path detecting function, and the peak detector 424 (that performs path detection for a serving cell) detects timings and gives the timings to a despreading processor (not shown) for receiving signals. The despreading processor performs despreading processing at given timings by using a despreading code.

In this embodiment, the despreading processor comprises a sliding correlator, a synchronous detector, and a RAKE synthesizer as shown in FIG. 1. But the despreading processor in this embodiment does not have a power calculator or a level converter, because it outputs RAKE synthesized data but does not calculate RSCP.

Figure 2A:
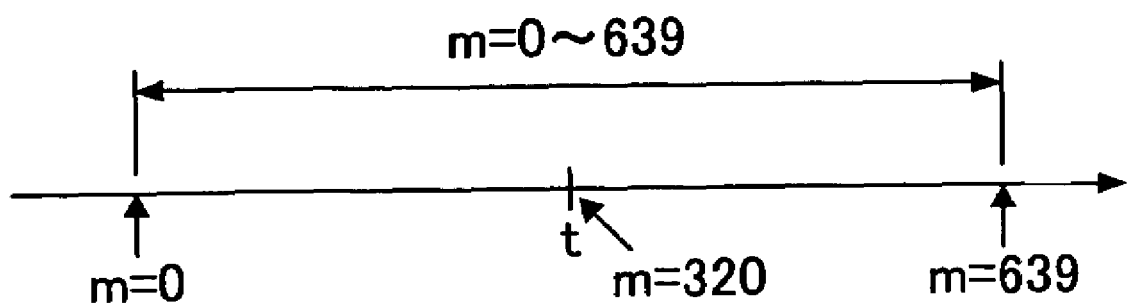
FIG. 2A and FIG. 2B show typical path and path timings.
Figure 2B:
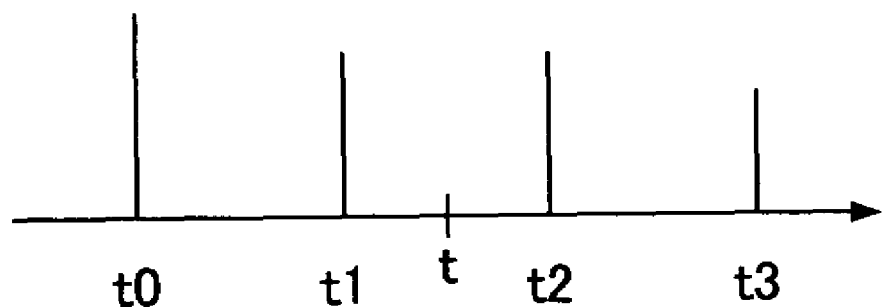

The matched filter 402 calculates correlation values cpich_symbol [m] [i] between a received signal "x" and known codes "c" for each sampling time within a predetermined range by the following Equation 3.

$$\text{cpich\_symbol}[m][i] = \sum_{k=1}^{nscode} x[t + (m - 320) + (i \times 1024) + 4 \times k] \times \text{code}[k] \quad \text{Equation 3}$$

wherein "m" is a parameter defining a sampling time, and m=0, 1, ..., 638, 639. The symbol "i" is a parameter defining a data symbol number, and i=0, 1, 2, .... Summation is done in the range of k=1, 2, ..., nscode. The nscode is the number of chips included in one symbol of CPICH signal, for example 256 chips. One chip is represented by four samples (four times over sampling). The symbol "t" means a path timing, which is determined by path searching. Within ±320 samples from this path timing being center, 640 correlation values as a total are calculated per one symbol. The relationship between "t" and "m" is illustrated in FIG. 2A. Code[k] means a spreading code, and may be represented by a product of a channelization code CC[k] and a scrambling code SC[k].

The power calculator 404 calculates the sum of squares of in-phase and quadrature coefficients of the correlation values to obtain a power value Pow(m). Such a power value Pow(m) is calculated for each of 640 correlation values obtained per symbol.

The time divider 406 switches the connection of power values from the power calculator 404 per a predetermined period, depending on a time division control signal. The interval for switching can be desirably set, but is (1/L) (L is an integer larger than 2) frame in this embodiment. The time division control signal may be generated by a controller (not shown).

The measuring unit 410 outputs a power level corresponding to signals from the cell #0, based on the power value from the power calculator 404.

The power accumulator 422 accumulates the power values Pow(m) obtained over 640 samples, at each sampling time. The number J of accumulations is adequately set depending on usage. That is, for a certain sampling time m, the Pow(m) can be calculated by sequentially accumulating by Pow(m)= Pow(m)(j=1)+ ... +Pow(m)(j=J). Preferably, the accumulation may be performed for five frames that is the same as the path revision period (j=1 is the first power value in the five frames and j=J is the last power value in the five frames), and the accumulated value may be divided by J for averaging.

The peak detector 424 selects the four largest power values among the accumulated 640 power values Pow(m), and establishes four sampling times $n_{max}(0)$, $n_{max}(1)$, $n_{max}(2)$ and $n_{max}(3)$ corresponding thereto. These sampling times correspond to path timings $t_0$, $t_1$, $t_2$ and $t_3$ in the prior method.

The memory 426 stores the power values input to the power accumulator 422 sequentially. That is, the memory 426 stores power values corresponding to the cell #0. The memory 426 obtains the above accumulated results or averaged cumulation values from the power accumulator 422, and stores them.

Based on the sampling times $n_{max}(0)$, $n_{max}(1)$, $n_{max}(2)$ and $n_{max}(3)$, the level converter 428 reads out from the memory, the power values Pow($n_{max}(0)$), Pow($n_{max}(1)$), Pow($n_{max}(2)$) and Pow($n_{max}(3)$) corresponding to these sampling times.

The level converter 428 performs a RAKE synthesis equivalent process, and calculates a signal-to-noise power ratio $E_c/N_0$ per one chip, according to the following equitation 4.

$$Ec/N_0 = \frac{1}{nscode} \sum_{k=0}^{3} Pow[n_{max}[k]] \qquad \text{Equation 4}$$

wherein "nscode" means the number of chips included in one symbol of the CPICH signal, 256 chips in this embodiment. The symbol "k" is a parameter specifying a power value read out in order of the power level, k=0, 1, 2, 3.

The level converter 428 scale-adjusts the signal-to-noise power ratio $E_c/N_0$ per one chip with received signal strength RSSI, in order to calculate power level RSCP to be reported to the network.

That is, RSCP=$E_c/N_0 \times$RSSI

The received signal strength RSSI can be obtained by receiving a gain control signal from an automatic gain controller (AGC), which is used for standardizing output levels of signals before inputting to the matched filer. For example, the received signal strength RSSI can be set to be proportional to the inverse of the control signal. In a case where a signal-to-noise power ratio Ec/No is set for plural times for one chip, their moving average or weighted moving average value can be utilized.

The level measured value calculated in this manner is transmitted to a network control device (RNC) via a radio base station, and utilized for handover or other processes.

FIG. 5 is a timing chart with respect to the level measurement and path search. Similar to FIG. 3, a radio signal to a mobile station shown in the upper side of FIG. 5 comprises a frame including plural time slots.

Similar to the previous example, a target cell to be measured is switched per every 1.5 slots. One slot is consumed for power measuring, and 0.5 slot is consumed for overhead as switching time for despreading code.

Figure 3:
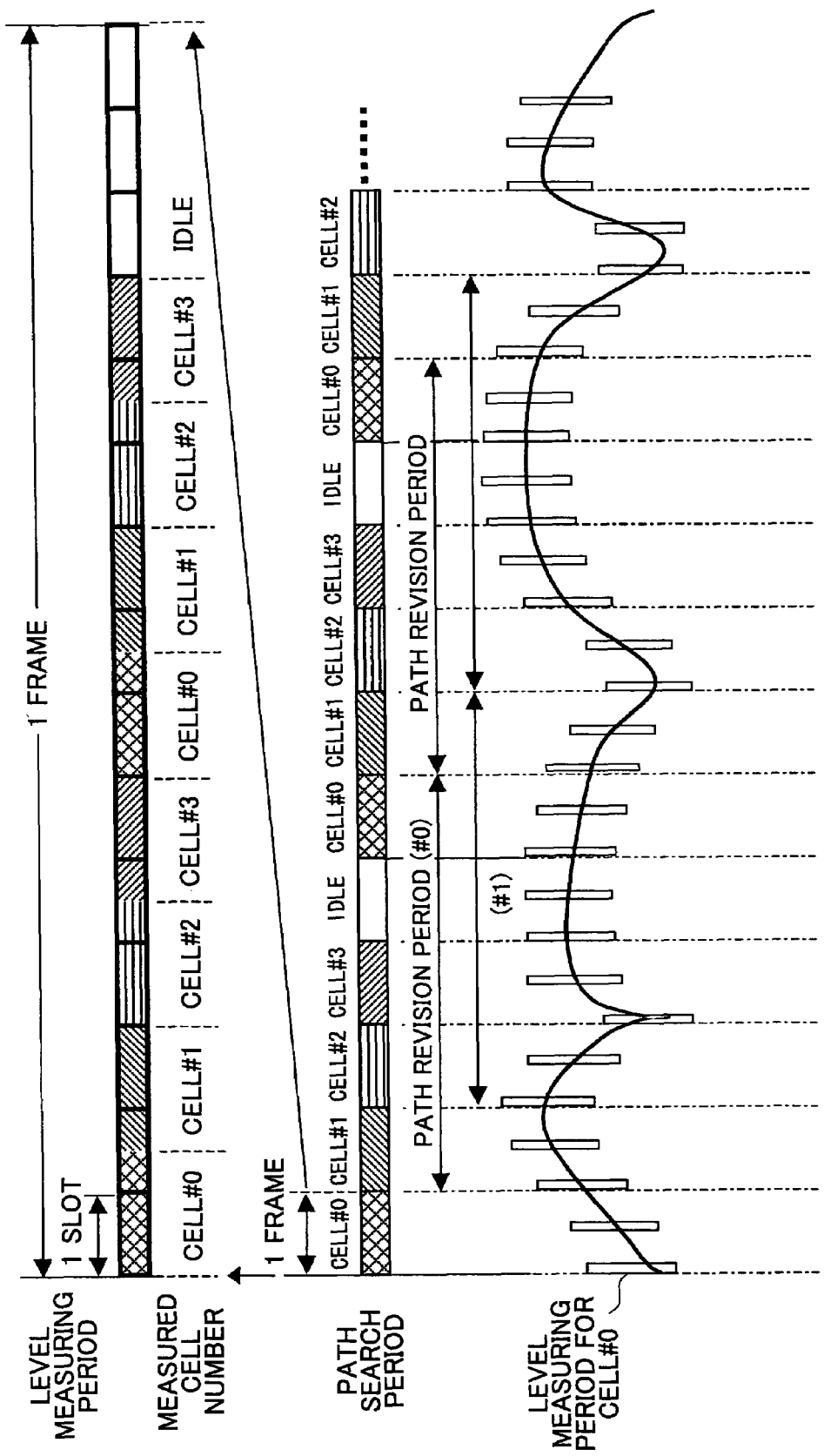
FIG. 3 is a timing chart with respect to level measuring and path searching.

Different from FIG. 3, path searches against plural cells are performed during one frame period, and a path search for one cell is performed over plural frames.

One path search for one cell only can be done during one frame. However, level measurements for different cells are performed during one frame, and therefore the matched filter 402 is provided in order with despreading codes corresponding to different cells in one frame.

Therefore, if one path search corresponding to only one cell included in one frame is carried out, then the time for performing the path search would be limited.

Then preferably, the level measurement time and path search time are made consistent, and the power accumulator 422 and the memory 426 are provided with correlating value, obtained during a period where despreading code corresponding to the cell #0 is assigned to the matched filter 402.

The level converter 428 performs level conversion and outputs a received power level, using the power value (already stored in the memory 426 and included in path revision period) corresponding to the path timing specified by the peak detector based on accumulated values obtained from the power accumulator 422 during the path revision period A.

Since the received power level is calculated based on the same signal as a received signal used in calculating new path timings (for each of the cell #0-cell #3) output after the path revision period shown in FIG. 5, the power level measuring accuracy is improved.

In the background prior art explained above, the path timing revision is different from cell to cell. In this embodiment, the path timing can be revised at a constant revision period. If not completely the same period, it is also possible to revise immediately before path searching or level measuring in an idle region or an overhead region, for example, in the first or sixth frame.

Since both the path searching duration and the level measuring duration are dispersed in one frame and path revision period, influence of instantaneous fading can be suppressed.

Correlation shown by a solid line in FIG. 5 typically represents that the reception level varies due to fading. It can be seen that the level measuring period is dispersed and therefore the influence of fading is well suppressed.

According to the embodiment of the present invention, the path searching unit functions also as a power level measuring unit. A sliding correlator or synchronous detector as shown in FIG. 1 does not have to be started for measuring power levels, and therefore power levels can be measured while consuming less power.

The power values Pow (m) as bases for calculating power levels, are stored in the memory 426, a past power value is designated by the value $n_{max}(i)$ selected as a path timing, and the designated power value Pow $(n_{max}(i))$ is used for calculating power level. Therefore, a received signal at detecting path timing and a received signal at calculating power level timing become the same signal, and accurate power level calculation is attained.

Further, the present invention is not limited to the embodiment, but variations and modifications may be made without departing from the scope of the present invention.

The present application is based on Japanese Priority Application No. 2004-236713 filed on Aug. 16, 2004, with the Japanese Patent Office, the entire contents of which are hereby incorporated by reference.

What is claimed is:

1. A power level measuring device, comprising:
a power calculator for calculating power values based on correlation values between a received signal and known signals, for each of sampling times within a predetermined period;
a time divider for switching connection of the power values input thereto from the power calculator, responding to time slots allocated to each of plural cells;
an accumulator connected to the time divider, for accumulating the power values from the power calculator through the time divider;
a detector for detecting at least one sampling time whose accumulated value is greater than a threshold;
a memory connected to the time divider, for storing the power values; and
an outputting unit for outputting a measured power level, based on the stored power value corresponding to the detected sampling time.

2. The power level measuring device as claimed in claim 1, wherein the predetermined period includes a path timing determined by cell searching.

3. The power level measuring device as claimed in claim 1, wherein the measured power level is proportional to received-signal-strength and to a signal-to-noise power ratio per chip.

4. The power level measuring device as claimed in claim 1, wherein received-signal-strength is determined by a control signal from an automatic gain controller.

5. The power level measuring device as claimed in claim 1, further comprising:
a converter for converting the power value to a signal-to-noise power ratio per chip.

6. The power level measuring device as claimed in claim 5, further comprising:
   an averaging unit for averaging the signal-to-noise power ratio per chip.

7. The power level measuring device as claimed in claim 1 wherein,
   the measured power levels with respect to the plural cells are output during one frame including a plurality of time slots.

8. The power level measuring device as claimed in claim 1 wherein,
   the measured power levels with respect to one cell are output at a constant timing during plural frames.

9. The power level measuring device as claimed in claim 1 further comprising:
   an averaging unit for averaging the correlation values.

10. A mobile station comprising:
   a correlation calculator configured to calculate correlations between a received signal and predetermined despreading codes;
   a power calculator configured to calculate power values based on the calculated correlations;
   a searching unit configured to store the calculated power values input thereto in a memory, and to detect path timings based on the input power values; and
   a power level measuring unit configured to receive the detected path timings from the searching unit, to extract ones of the power values stored in the memory corresponding to the received detected path timings, and to calculate a received power level based on the extracted ones of the power values.

* * * * *